United States Patent
Tanaka et al.

(10) Patent No.: US 10,825,610 B2
(45) Date of Patent: Nov. 3, 2020

(54) METHOD FOR PRODUCING MULTILAYER CERAMIC ELECTRONIC COMPONENT

(71) Applicant: Murata Manufacturing Co., Ltd., Nagaokakyo-shi (JP)

(72) Inventors: Hidehiko Tanaka, Nagaokakyo (JP); Toshikazu Makino, Nagaokakyo (JP); Shinji Otani, Nagaokakyo (JP)

(73) Assignee: MURATA MANUFACTURING CO., LTD., Nagaokakyo-Shi (JP)

( * ) Notice: Subject to any disclaimer, the term of this patent is extended or adjusted under 35 U.S.C. 154(b) by 363 days.

(21) Appl. No.: 15/916,727

(22) Filed: Mar. 9, 2018

(65) Prior Publication Data
US 2018/0269000 A1    Sep. 20, 2018

(30) Foreign Application Priority Data
Mar. 15, 2017 (JP) ................ 2017-049906

(51) Int. Cl.
*H01G 4/30* (2006.01)
*H01G 4/008* (2006.01)
(Continued)

(52) U.S. Cl.
CPC ............. *H01G 4/30* (2013.01); *H01G 4/008* (2013.01); *H01G 4/1227* (2013.01);
(Continued)

(58) Field of Classification Search
CPC ........... H01G 4/008; H01G 4/30; H01G 4/33; H01G 4/306; H01G 4/1227; H01G 4/1236; H01G 4/224; H01G 4/232
See application file for complete search history.

(56) References Cited

U.S. PATENT DOCUMENTS

| 6,780,494 B2 * | 8/2004 | Kobayashi | H01G 4/30 428/210 |
| 7,828,033 B2 * | 11/2010 | Aoki | H01G 4/30 156/349 |

(Continued)

FOREIGN PATENT DOCUMENTS

| JP | H9-129487 A | 5/1997 |
| JP | 2003203824 A | 7/2003 |

(Continued)

*Primary Examiner* — Peter Dungba Vo
*Assistant Examiner* — Jeffrey T Carley
(74) *Attorney, Agent, or Firm* — Arent Fox LLP (57) ABSTRACT

A method for producing a multilayer ceramic electronic component the includes producing a multilayer sheet having a plurality of multilayer ceramic green sheets and internal electrode patterns respectively arranged along a plurality of interfaces between the ceramic green sheets, and having a first main surface and a second main surface that face each other in a lamination direction thereof; placing, and pressure-bonding under heating, a resin composition onto at least one of the first main surface and the second main surface of the multilayer sheet to produce a mother block having an unfixed protection layer thereon; and cutting the mother block along a first-direction cutting-plane line and a second-direction cutting-plane line that are orthogonal to each other to produce a plurality of green chips. The resin composition includes a resin component having a melting point or a glass transition temperature of lower than 100° C. and inorganic compound particles.

16 Claims, 6 Drawing Sheets

(51) Int. Cl.
  *H01G 4/12* (2006.01)
  *H01G 4/232* (2006.01)
  *H01G 4/224* (2006.01)
  *H01G 4/33* (2006.01)

(52) U.S. Cl.
  CPC .......... *H01G 4/1236* (2013.01); *H01G 4/224* (2013.01); *H01G 4/232* (2013.01); *H01G 4/306* (2013.01); *H01G 4/33* (2013.01)

(56) References Cited

U.S. PATENT DOCUMENTS

| | | | | |
|---|---|---|---|---|
| 8,995,109 B1* | 3/2015 | Tsutsumi | | B32B 37/10 361/301.4 |
| 9,001,493 B2 | 4/2015 | Kim et al. | | |
| 9,036,329 B2* | 5/2015 | Chung | | H01G 4/30 361/303 |
| 9,039,859 B2* | 5/2015 | Tanaka | | B32B 38/0004 156/250 |
| 9,812,259 B2* | 11/2017 | Lee | | H01G 4/30 |
| 10,079,095 B2* | 9/2018 | Cha | | H01G 4/1227 |
| 10,304,632 B2* | 5/2019 | Lee | | H01G 4/30 |
| 2007/0230088 A1* | 10/2007 | Fujimura | | C04B 35/638 361/311 |
| 2014/0022690 A1* | 1/2014 | Kim | | H01G 4/30 361/301.4 |

FOREIGN PATENT DOCUMENTS

| | | |
|---|---|---|
| JP | 2005136046 A | 5/2005 |
| JP | 2006-128282 A | 5/2006 |
| JP | 2008066556 A | 3/2008 |
| JP | 5221059 B2 | 6/2013 |
| JP | 2014-22719 A | 2/2014 |

* cited by examiner

METHOD FOR PRODUCING MULTILAYER CERAMIC ELECTRONIC COMPONENT

CROSS REFERENCE TO RELATED APPLICATIONS

The present application claims priority to Japanese application No, 2017-049906, filed Mar. 15, 2017, the entire contents of which are incorporated herein by reference.

BACKGROUND OF THE INVENTION

Field of the Invention

The present invention relates to a method for producing a multilayer ceramic electronic component.

Description of the Related Art

A multilayer ceramic capacitor is a chip-type ceramic capacitor produced by laminating a plurality of dielectric layers each made from titanium oxide, barium titanate or the like and a plurality of internal electrode layers. A multilayer ceramic capacitor can achieve a small size and a large capacity while taking advantage of a ceramic material, such as excellent high frequency properties, and therefore can be used widely in electronic circuits.

A multilayer ceramic capacitor can be produced fay, for example, the following method. First, a conductive paste, which serves as an internal electrode, is applied onto the surfaces of a plurality of ceramic green sheets by a screen printing technique or the like, then the ceramic green sheets are laminated together so that the ceramic sheets and the layers of the conductive paste can be arranged alternately, and then the resultant laminate is pressure-bonded under heating to form a multilayer sheet. Subsequently, the multilayer sheet is cut into pieces to form chipped laminates. Subsequently, each of the chipped laminates is fired, and then terminal electrodes are formed in each of the laminates. In this manner, the multilayer ceramic capacitor can be produced.

However, when ceramic green sheets each having internal electrodes printed thereon are pressure-bonded together under heating, there is a problem that the thickness of each of the ceramic green sheets becomes uneven as observed in the direction of lamination due to the variations in density of the internal electrodes and therefore unevenness (level difference) occurs on the surface of the resultant multilayer sheet.

The above-mentioned problem is a problem common to the production of a multilayer ceramic capacitor and the production of a multilayer ceramic electronic component other than a multilayer ceramic capacitor.

In these situations, Japanese Patent No. 5221059 discloses a method for producing a multilayer ceramic electronic component, including the steps of alternately laminating a plurality of ceramic green sheets and a plurality of electrode layers each having a specific pattern to form a green ceramic laminate and firing the laminate, wherein, prior to the formation of the laminate, empty space pattern layers each having substantially the same thickness as those of the electrode layers are formed in void parts in the electrode layers each having a specific pattern using a specific printing paste.

SUMMARY OF THE INVENTION

In the method disclosed in Japanese Patent No. 5221059, the internal electrode pattern is formed and subsequently the empty space pattern layer is formed in the gap parts on which the internal electrodes are not to rated. As a result, the ceramic green sheets and the electrode layers can be laminated while flatting the formed surface. The internal electrode pattern and the empty space pattern layer have a relationship between a negative image and a positive image of a photograph film.

However, it is difficult to precisely print an empty space pattern in a gap part on which no internal electrode is formed, and therefore structural defects resulting from printing misalignment or the like may occur. Furthermore, in each layer of the ceramic green sheets to be laminated, it is required to perform printing while controlling the positions of the internal electrodes and the empty space pattern layers. As a result, the time required for a printing process may be prolonged, leading to the deterioration in production efficiency.

The present invention is achieved for solving the above-mentioned problems. The object of the present invention is to provide a method for producing a multilayer ceramic electronic component, whereby it becomes possible to produce a multilayer ceramic electronic component having little structural defects with high efficiency.

The method for producing a multilayer ceramic electronic component according to the present invention includes:

producing a multilayer sheet which includes a plurality of multilayer ceramic green sheets and internal electrode patterns respectively arranged along a plurality of interfaces between the ceramic green sheets and has a first main surface and a second main surface that face each other in a lamination direction;

placing, and pressure-bonding under heating, a resin composition onto at least one of the first main surface and the second main surface of the multilayer sheet to produce a mother block having an unfired protection layer formed thereon; and cutting the mother block along a first-direction cutting-plane line and a second-direction cutting-plane line that are orthogonal to each other to produce a plurality of green chips each having a multilayer structure composed of a plurality of unfired ceramic layers and a plurality of unfired internal electrodes.

The resin composition includes a resin component having a melting point or a glass transition temperature of lower than 100° C., and includes inorganic compound particles. The content of the inorganic compound particles in the resin composition is 40 vol % to 70 vol % inclusive, and the resin composition has a storage elastic modulus of $1.0 \times 10^8$ Pa or less at 80° C. in a dynamic viscoelasticity measurement at a vibration frequency of 10 Hz.

In the method for producing a multilayer ceramic electronic component according to the present invention, it is preferred that the resin component contains at least one ethylene-based copolymer selected from an ethylene-(vinyl acetate) copolymer, an ethylene-(methyl acrylate) copolymer, an ethylene-(methyl methacrylate) copolymer, an ethylene-(ethyl acrylate) copolymer, a (vinyl chloride)-(vinyl acetate) copolymer, an ethylene-(acrylic acid) copolymer and an ethylene-(methacrylic acid) copolymer.

In the method for producing a multilayer ceramic electronic component according to the present invention, it is preferred that each of the inorganic compound particles contains a perovskite-type ceramic composition containing at least one element selected from Ba, Ca, Sr and Pb and at least one element selected from Ti, Zr and Hf.

In the method for producing a multilayer ceramic electronic component according to the present invention, it is preferred that the unfired protection layer has a thickness of 1 μm to 10000 μm inclusive.

According to the present invention, a multilayer ceramic electronic component having little structural defects can be produced with high efficiency.

BRIEF DESCRIPTION OF THE DRAWINGS

FIG. 5E and FIG. 5C are each a plan view schematically illustrating one embodiment of a method for laminating ceramic green sheets;

DETAILED DESCRIPTION OF THE INVENTION

Hereinafter, the method for producing a multilayer ceramic electronic component according to the present invention will be described.

However, the present invention is not intended to be limited to the constitutions mentioned below, and it is also possible to arbitrarily implement the invention within a scope having no modification of the gist of the present invention. The present invention also includes, within the scope thereof, a combination of two or more of the desired constitutions described in the followings.

As one embodiment of the method for producing a multilayer ceramic electronic component according to the present invention, a method for producing a multilayer ceramic capacitor will be described as one example. The production method of the present invention can also be applied to a multilayer ceramic electronic component other than a multilayer ceramic capacitor.

First, a multilayer ceramic capacitor produced by the method for producing a multilayer ceramic electronic component according to the present invention will be described.

Figure 1:
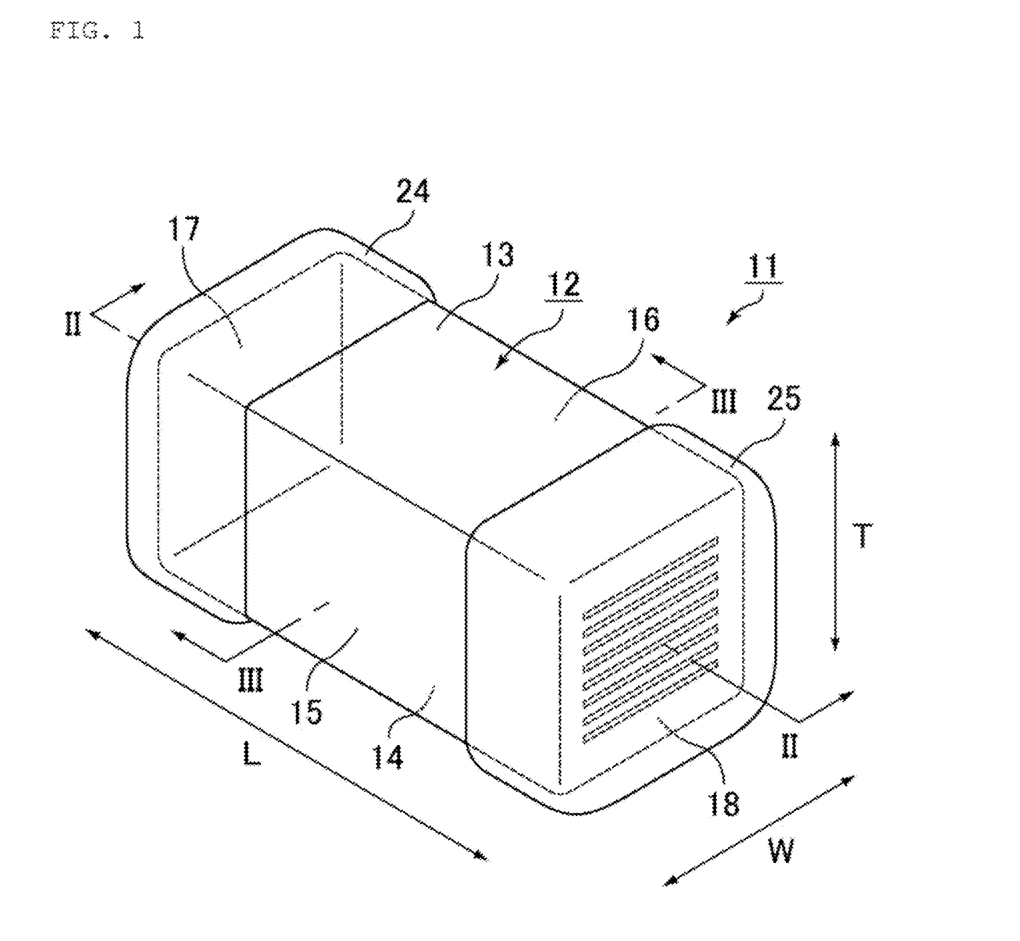
FIG. 1 is a perspective view schematically illustrating one embodiment of a multilayer ceramic capacitor produced by the method for producing a multilayer ceramic electronic component according to the present invention.
Figure 2:
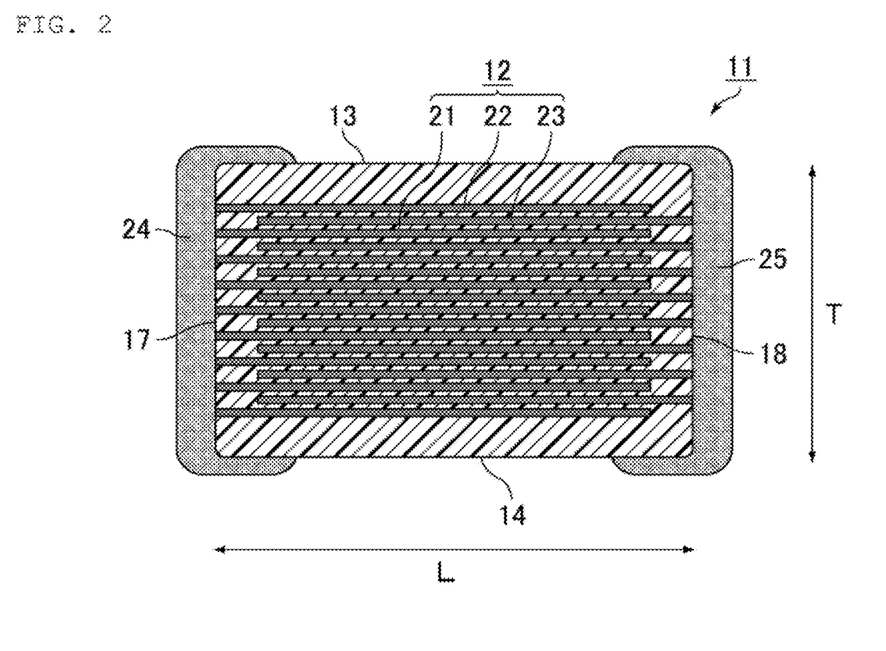
FIG. 2 is a cross-sectional view of the multilayer ceramic capacitor shown in FIG. 1 taken along the line II-II.
Figure 3:
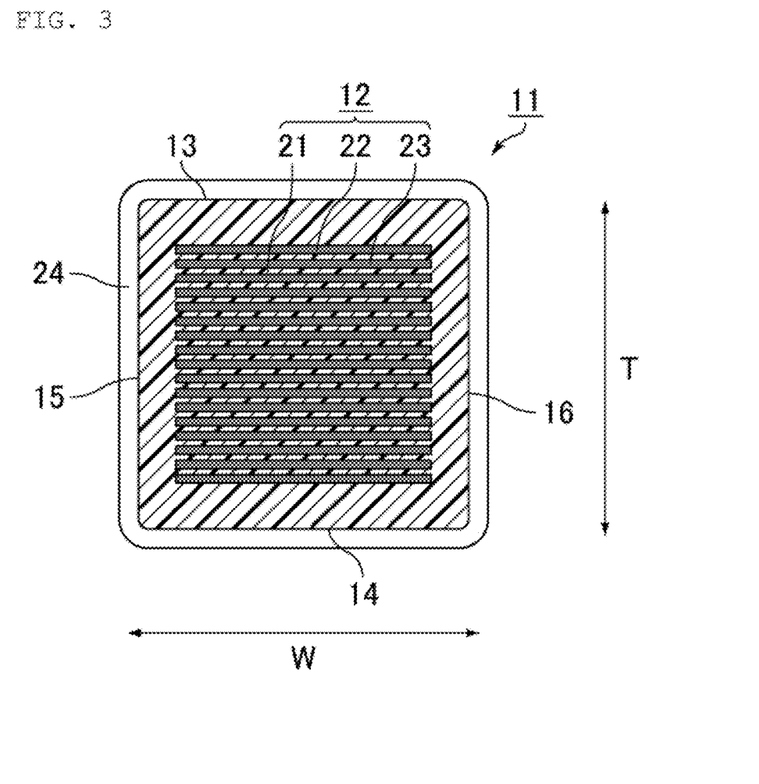
FIG. 3 is a cross-sectional view of the multilayer ceramic capacitor shown in FIG. 1 taken along the line III-III.

FIG. 1 is a perspective view schematically illustrating one embodiment of a multilayer ceramic capacitor produced by the method for producing a multilayer ceramic electronic component according to the present invention. FIG. 2 is a cross-sectional view of the multilayer ceramic capacitor shown in FIG. 1 taken along the line II-II. FIG. 3 is a cross-sectional view of the multilayer ceramic capacitor shown in FIG. 1 taken along the line III-III.

In this specification, the lamination direction, the width direction and the length direction of a multilayer ceramic capacitor are those directions defined by arrows T, W and L, respectively, in a multilayer ceramic capacitor 11 shown in FIGS. 1, 2, and 3. The lamination direction, the width direction and the length direction are orthogonal to one another. The lamination direction refers to a direction of the lamination of a plurality of ceramic layers 21 and a plurality of pairs of internal electrodes 22 and 23.

The multilayer ceramic capacitor 11 shown in FIG. 1 includes a component main body 12. As shown in FIGS. 1, 2, and 3, the component main body 12 has a rectangular or approximately rectangular form, and has a first main surface 13 and a second main surface 14 which face each other in the lamination direction T, a first side surface 15 and a second side surface 16 which face each other in the width direction W that is orthogonal to the lamination direction T, and a first edge surface 17 and a second edge surface 18 which face each other in the length direction L that is orthogonal to both of the lamination direction T and the width direction W.

As shown in FIGS. 2 and 3, the component main body 12 has a multilayer structure composed of a plurality of ceramic layers 21 which extend in the directions of the first main surface 13 and the second main surface 14 and are laminated in a direction orthogonal to the first main surface 13 and the second main surface 14; and a plurality of pairs of internal electrodes 22 and 23 which are formed along interfaces between the ceramic layers 21.

As mentioned below, the component main body 12 can be produced by producing a mother block and then cutting the mother block into a plurality of green chips. For the production of the mother block, first a predetermined number of ceramic green sheets each having a conductive paste applied on the surface thereof are laminated, on each other to produce a multilayer sheet. A resin composition is placed onto at least one of the main surfaces of the multilayer sheet and is then pressure-bonded under heating. In this manner, a mother block having an unfired protection layer formed thereon can be produced.

As shown in FIGS. 2 and 3, the internal electrode 22 and the internal electrode 23 face each other with the ceramic layer 21 interposed therebetween. Because of the internal electrode 22 and the internal electrode 23 face each other, electric properties can be exerted. Namely, an electrostatic capacitance can be formed in the multilayer ceramic capacitor 11 shown in FIG. 1.

The internal electrode 22 has an exposed end that is exposed on the first edge surface 17 of the component main body 12, and the infernal electrode 23 has an exposed end that is exposed on the second edge surface 18 of the component main body 12. However, the internal electrodes 22 and 23 are not exposed on the first side surface 15 or the second side surface 16 of the component main body 12.

As shown in FIGS. 1, 2 and 3, the multilayer ceramic capacitor 11 additionally includes a first external electrode 24 provided on the first edge surface 17 of the component main body 12 and a second external electrode 25 provided on the second edge surface 18 of the component main body 12, wherein the first external electrode 24 and the second external electrode 25 are arranged so as to be electrically connected to the exposed ends of the internal electrodes 22 and 23, respectively.

The first external electrode 24 and the second external electrode 25 are formed on the first edge surface 17 and the second edge surface 18 of the component main body 12, respectively. In FIG. 1, each of the first external electrode 24 and the second external electrode 25 has a part which comes around a portion of each of the first main surface 13, the second main surface 14, the first side surface 15 and the second side surface 16.

The outer shape and the dimension of the component main body are not particularly limited, and can be selected appropriately depending on the intended use. In the case where the outer shape of the component main body is rectangular or approximately rectangular, the length size (the length in the L direction in FIG. 1), which is a size as measured in the edge surface direction, of the component main body is generally 0.4 mm to 5.6 mm inclusive, the width size (the length in the W direction in FIG. 1), which is a size as measured in the side surface direction, of the component main body is generally 0.2 mm to 5.0 mm inclusive, and the thickness size (the length in the T direction in FIG. 1), which is a size as measured in the lamination direction, of the component main body is generally 0.2 mm to 1.9 mm inclusive.

As the ceramic material constituting the ceramic layer, a dielectric ceramic containing, as the main component, barium titanate, calcium titanate, strontium titanate, calcium zirconate or the like can be used, for example.

As mentioned above, the production method according to the present invention can be applied to a multilayer ceramic electronic component other than a multilayer ceramic capacitor. For example, a piezoelectric ceramic (e.g., a PZT-type ceramic) can be used in the case where the multilayer ceramic electronic component is a piezoelectric component, and a semiconductor ceramic (e.g., a spinel-type ceramic) can be used in the case where the multilayer ceramic electronic component is a thermistor.

The thickness of the ceramic layer is not particularly limited, and is preferably 5 μm or less, more preferably 3 μm or less.

As the conductive material constituting the internal electrode, a metal material such as Ni, Cu, Ag, Pd, an Ag—Pd alloy, Au or the like can be used.

The thickness of the internal electrode is not particularly limited, and is generally 2 μm or less, preferably 0.5 μm to 1.5 μm inclusive.

It is preferred that each of the external electrodes is composed of an underlying layer and a plated layer formed on the underlying layer. As the conductive material constituting the underlying layer, Cu, Ni, Ag, Pd, an Ag—Pd alloy, Au or the like can be used. The underlying layer may be formed by employing a co-firing process in which a conductive paste is applied onto the unfired component main body and then the conductive paste and the component main body are fired simultaneously, or may be formed by employing a post-firing process in which the conductive paste is applied onto the fired component main body and then the resultant product is baked. Alternatively, the underlying layer may be formed by direct plating, or may be formed by curing a conductive resin containing a heat-curable resin.

The plated layer to be formed on the underlying layer preferably has a two-layer structure composed of a nickel plating and a tin plating formed on the nickel plating.

The thickness of the external electrode is not particularly limited, and is generally 10 μm to 50 μm inclusive.

Next, as one embodiment of the method for producing a multilayer ceramic electronic component according to the present invention, a method for producing the multilayer ceramic capacitor 11 shown in FIG. 1 will be described.

First, a ceramic green sheet that serves as a ceramic layer is prepared. For example, the ceramic green sheet is formed on a carrier sheet, which serves as a support, by a wire bar coater method, a doctor blade technique or the like using a dielectric paste.

The dielectric paste is composed of an organic solvent-based paste that is produced by kneading a ceramic powder (a dielectric raw material) with an organic vehicle containing an organic binder and an organic solvent. If necessary, the dielectric paste may contain additives such as various types of dispersants, a plasticizer, a charge-removing agent, a dielectric material, a glass frit and an insulating body. The dielectric paste can be produced by kneading the above-mentioned components with a ball mill or the like to prepare a slurry.

The thickness of the ceramic green sheet is preferably 5 μm or less, more preferably 3 μm or less.

Next, an electrode layer having a predetermined pattern (i.e., an internal electrode pattern), which serves as an internal electrode, is formed on the ceramic green sheet. The method for forming the internal electrode pattern is not particularly limited, as long as the electrode layer can be formed uniformly. For example, a screen printing method using a conductive paste or the like can be employed.

Figure 4:
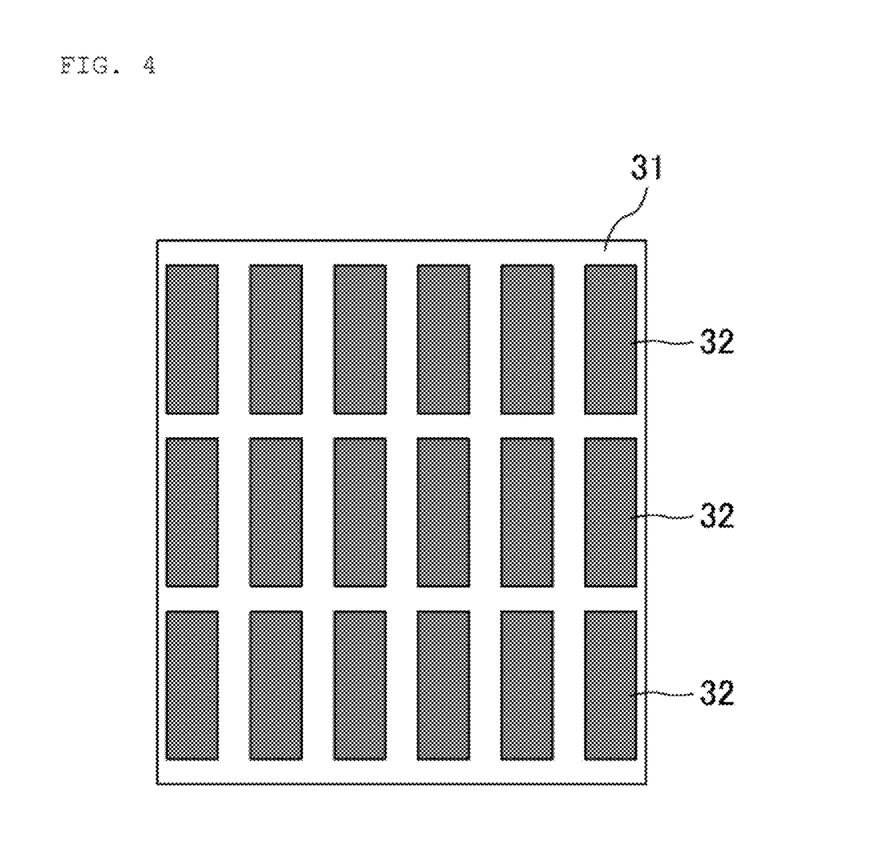
FIG. 4 is a plan view schematically illustrating one embodiment of a ceramic green sheet having an internal electrode pattern formed thereon.

FIG. 4 is a plan view schematically illustrating one embodiment of a ceramic green sheet having an internal electrode pattern formed thereon.

As shown in FIG. 4, a conductive paste is applied on a ceramic green sheet 31, which serves as the ceramic layer 21, in such a manner that a predetermined pattern can be formed, whereby an internal electrode pattern 32 that serves as each of the internal electrodes 22 and 23 can be formed. Concretely, a matrix-type internal electrode pattern 32 is formed on the ceramic green sheet 31.

The conductive paste can be prepared by kneading a conductive material including any one of various conductive metals and alloys, any one of various oxides that can be converted into the above-mentioned conductive material after firing, and an organic metal compound or a resinate or the like together with an organic vehicle containing an organic binder and an organic solvent. From the viewpoint of the improvement in bondability, it is preferred that the conductive paste contains a plasticizer. The conductive paste can be produced by kneading the above-mentioned components with a ball mill or the like to prepare a slurry.

The thickness of the internal electrode pattern is generally 2 μm or less, preferably 0.5 μm to 1.5 μm inclusive.

Subsequently, a predetermined number of the ceramic green sheets each having the internal electrode pattern formed thereon are laminated together while shifting the positions of the ceramic green sheets from each other, and then a predetermined number of the ceramic green sheets each having no internal electrode pattern formed thereon are further laminated over and below the above-mentioned laminate. In this manner, a multilayer sheet can be produced.

Figure 5A:
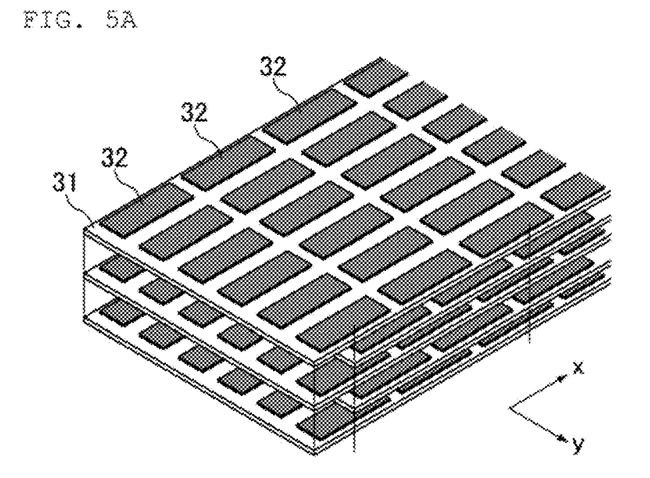
FIG. 5A is a perspective view schematically illustrating one embodiment of a method for laminating ceramic green sheets.

FIG. 5A is a perspective view schematically illustrating one embodiment of a method for laminating ceramic green sheets.

As shown in FIG. 5A a predetermined number of the ceramic green sheets 31 each having the internal electrode pattern 32 formed thereon are laminated together in such a manner that the positions of the ceramic green sheets 31 are shifted at predetermined spacings along the x direction, namely the pitches of the internal electrode patterns 32 are shifted by ½ in the x direction. Subsequently, a predetermined number of the ceramic green sheets each having no internal electrode pattern formed thereon are further laminated over and below the above-produced laminate.

Figure 5B:
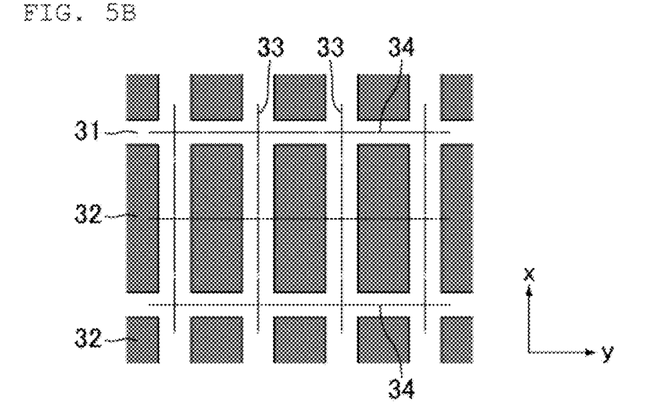
Figure 5C:
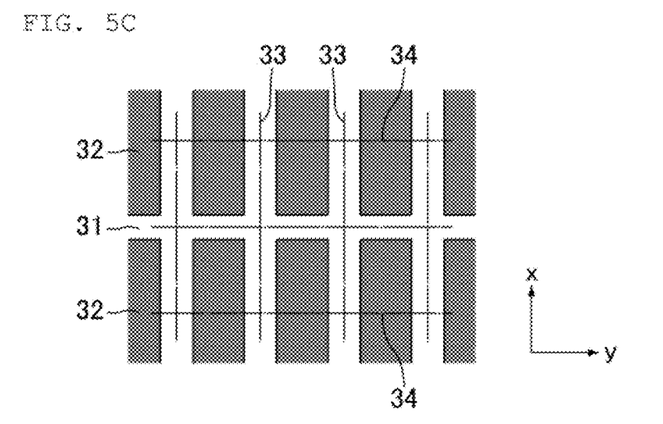

Each of FIGS. 5B and 5C is a plan view schematically illustrating one embodiment of a method for laminating the ceramic green sheets. FIGS. 5B and 5C are enlarged views of the $1^{st}$-layer ceramic green sheet and the $2^{nd}$-layer ceramic green sheet, respectively.

In FIGS. 5B and 5C, a portion of a cutting-plane line 33 in a first direction (the x direction in FIGS. 5B and 5C) and a portion of a cutting-plane line 34 in a second direction orthogonal to the first direction (the y direction in FIGS. 5B and 5C) are shown, respectively. The matrix-type internal electrode pattern 32 has such a form that two internal electrodes 22 and 23 that are connected to each other at extended parts thereof are aligned along the first direction (the x direction). In both of FIGS. 5B and 5C, the cutting-plane lines 33 and 34 are shown in common.

Figure 6:
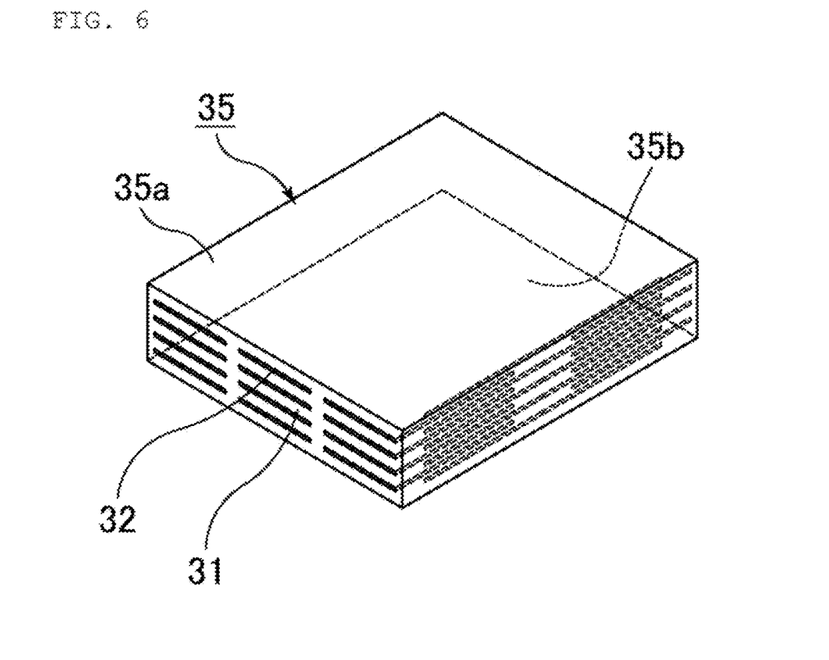
FIG. 6 is a perspective view schematically illustrating one embodiment of a multilayer sheet.

FIG. 6 is a perspective view schematically illustrating one embodiment of the multilayer sheet.

The multilayer sheet 35 shown in FIG. 6 includes a plurality of multilayer ceramic green sheets 31 and internal electrode patterns 32 respectively arranged along a plurality of interfaces between the ceramic green sheets 31, and has at first main surface 35a and a second main surface 35b which face each other in the lamination direction.

Subsequently, a resin composition containing a resin component and inorganic compound particles is provided on at least one main surface of the multilayer sheet, and then the resultant, product is pressure-bonded under heating. An example of the method for the pressure-bonding under heating is a method in which the product is pressed in the lamination direction by means of a rigid press, an isostatic press or the like.

In this manner, a mother block having an unfired protection layer formed thereon can be produced.

Figure 7:
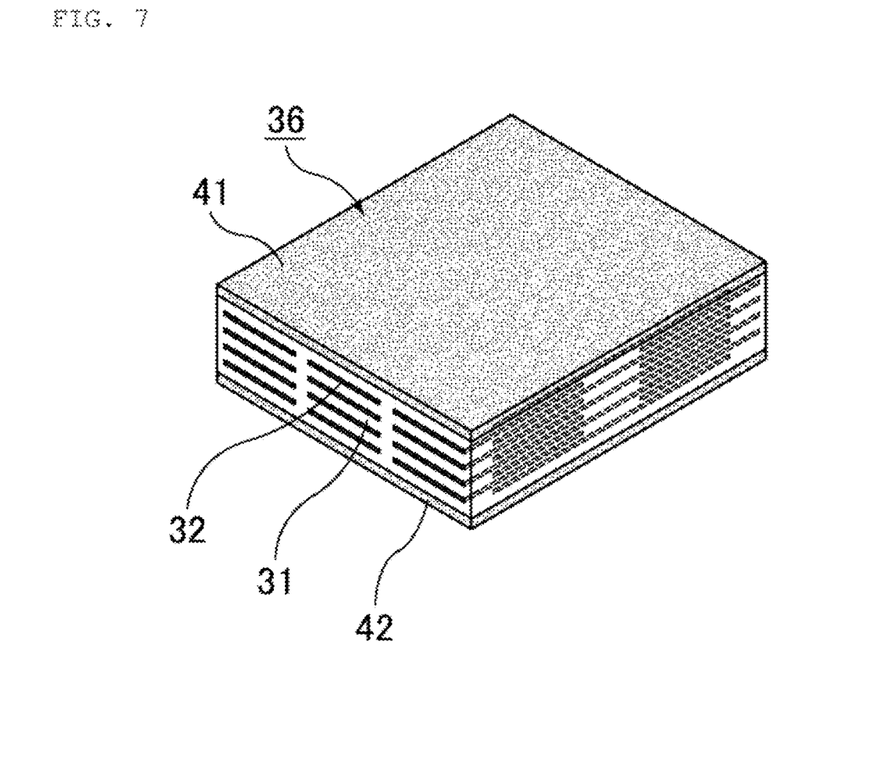
FIG. 7 is a perspective view schematically illustrating one embodiment of a mother block.

FIG. 7 is a perspective view schematically illustrating one embodiment of a mother block.

In the mother block 36 shown in FIG. 7, an unfired protection layer 41 is formed on a first main surface 35a of the multilayer sheet 35, and an unfired protection layer 42 is formed on a second main surface 35b of the multilayer sheet 35.

As mentioned above, the unfired protection layer may be formed on at least one main surface of the multilayer sheet. In other words, the unfired protection layer may be formed on either one of the main surfaces of the multilayer sheet, or may be formed on both of the main surfaces of the multilayer sheet.

In the method for producing a multilayer ceramic electronic component according to the present invention, the unfired protection layer is formed using a resin composition as mentioned in detail below. The resin composition contains inorganic compound particles, and therefore can act as a ceramic layer after being fired. In addition, the resin composition has excellent followability to unevenness and excellent surface smoothness. Therefore, when the resin composition is provided on at least one main surface of the multilayer sheet to form an unfired protection layer, the resin composition can follow the unevenness on the surface of the multilayer sheet to fill depressed parts and can make the surface of the multilayer sheet smooth. As a result, a multilayer ceramic electronic component having little structural defects can be produced.

According to the method for producing a multilayer ceramic electronic component according to the present invention, depressed parts can be filled without needing to form an empty space pattern layer as described in Japanese Patent No. 5221059. Therefore, the time required for a printing process can be shortened, and a multilayer ceramic electronic component having little structural defects can be produced with high efficiency.

The method for placing the resin composition on at least one main surface of the multilayer sheet is not particularly limited, as long as the unfired protection layer can be formed. For example, a method in which a resin sheet produced by molding the resin composition into a sheet-like form or a film-like form is laminated on the multilayer sheet, a method in which a molten or rubbery resin composition is applied onto a multilayer sheet, and the like can be mentioned.

In the method for producing a multilayer ceramic electronic component according to the present invention, the thickness of the unfired protection layer is preferably 1 μm or more, more preferably 30 μm or more. The thickness of the unfired protection layer is also preferably 10000 μm or less, more preferably 3000 μm or less.

<Resin Composition>

Hereinafter, one embodiment of the resin composition to be used in the present invention will be described.

The resin composition according to this embodiment is approximately composed of a resin component having a melting point or a glass transition temperature of lower than 100° C. and inorganic compound particles.

(Resin Component)

The resin component to be contained in the resin composition has a melting point or a glass transition temperature of lower than 100° C. The lower limit of the melting point or the glass transition temperature of the resin component is not particularly limited, and the melting point or the glass transition temperature of the resin component is preferably 40° C. or higher, more preferably 50° C. or higher. When the melting point or the glass transition temperature of the resin component is 40° C. or higher, the occurrence of deformation during lamination can be prevented.

The melting point or the glass transition temperature of the resin component can be measured with a differential scanning calorimetric (DSC) device. The measurement of the glass transition temperature is carried out in accordance with JIS K 7121-1987.

Examples of the resin component include: at least one ethylene-based copolymer selected from the group consisting of an ethylene-(vinyl acetate) copolymer, an ethylene-(methyl acrylate) copolymer, an ethylene-(methyl methacrylate) copolymer, an ethylene-(ethyl acrylate) copolymer, a (vinyl chloride)-(vinyl acetate) copolymer, an ethylene-(acrylic acid) copolymer and an ethylene-(methacrylic acid) copolymer; and others. Among these components, an ethylene-(vinyl acetate) copolymer (EVA), an ethylene-(methyl acrylate) copolymer (EMA), an ethylene-(methyl methacrylate) copolymer (EMMA) and an ethylene-(ethyl acrylate) copolymer (EEA) are more preferred, and an ethylene-(methyl acrylate) copolymer (EMA) and an ethylene-(methyl methacrylate) copolymer (EMMA) are still more preferred. When the resin component contains an ethylene-based copolymer (an ethylene-based elastomer) having high affinity for metals, the inorganic compound particles can be highly dispersed in the resin composition and the strength of a film produced from the resin composition can be improved.

The ethylene-based copolymer contains ethylene and a vinyl group having a polar group as monomer units. The content of the vinyl group having a polar group in the ethylene-based copolymer is preferably 5% to 50% by mass inclusive, more preferably 10% to 45% by mass inclusive, relative to the total mass of the ethylene-based copolymer. When the content of the vinyl group having a polar group is 5% by mass or more, the inorganic compound particles can be contained in a sufficient amount. When the content of the vinyl group having a polar group is 50% by mass or less, the occurrence of blocking can be prevented.

The ethylene-based copolymer may contain an additional monomer unit, as long as the advantageous effects of the present invention cannot be impaired. Specific examples of the additional monomer unit include: an α-olefin such as propylene, n-butene and isobutylene; acrylic acid or a salt thereof; an acrylic acid ester such as methyl acrylate, ethyl acrylate, n-propyl acrylate, i-propyl acryiate, n-butyl acrylate, i-butyl acrylate, t-butyl acrylate, 2-ethylhexyl acrylate, dodecyl acrylate, and octadecyl acrylate; methacrylic acid or a salt thereof; a methacrylic acid ester such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate, and octadecyl methacrylate; acrylamide; an acrylamide derivative such as N-methylacrylamide, N-ethylacrylamide, N,N-dimethylacrylamide, diacetoneacrylamide, acrylamidepropanesulfonic acid or a salt thereof, acrylamidepropyldimethylamine or an acid salt or quaternary salt thereof, and N-methylolacrylamide or a derivative thereof; methacrylamide; a methacrylamide derivative such as N-methylmethacrylamide, N-ethylmethacrylamide, methacrylamidepropanesulfonic acid or a salt thereof, methacrylamidepropyldimethylamine or an acid salt or quaternary salt thereof, and N-methylolmethacrylamide or a derivative thereof; a vinyl ether such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, and stearyl vinyl ether; a nitrile such as acrylonitrile and methacrylonitrile; a vinyl halide such as vinyl chloride and vinyl fluoride; a vinylidene halide such as vinyl chloride and vinylidene fluoride; an allyl compound such as allyl acetate and allyl chloride; maleic acid, or a salt, ester or anhydride thereof; a vinyl, silyl compound such as vinyltrimethoxysilane; and isopropenyl acetate. The content of the additional monomer unit is preferably 10% by mass or less, and may be 0% by mass.

The ethylene-based copolymer may have a functional group (e.g., a hydroxyl group, a carboxyl group, an acid anhydride group, an amino group and a trimethoxysilyl group) in the molecular chain thereof or a molecular chain terminal thereof, as long as the advantageous effects of the present invention cannot be impaired.

The molecular weight of the ethylene-based copolymer is not particularly limited. From the viewpoint of the moldability into a film, the weight average molecular weight (Mw) of the ethylene-based copolymer as measured by gel permeation chromatography (GPC) is $1 \times 10^4$ to $2 \times 10^6$ inclusive in terms of polystyrene.

With respect to the molecular weight distribution of the ethylene-based copolymer, the (weight average molecular weight)/(number average molecular weight) (Mw/Mn) value is not particularly limited, and is preferably 1.0 to 3.5 inclusive, more preferably 1.1 to 3.0 inclusive, from the viewpoint of the stickiness and appearance of a film produced from the resin composition.

The content of the ethylene-based copolymer is preferably 20% by mass or more, more preferably 40% by mass or more, relative to the total mass of the resin components. When the content of the ethylene-based copolymer is 20% by mass or more, strength necessary for the handling of the resultant film can be retained.

In the resin composition of this embodiment, an additional resin component other than an ethylene-based copolymer may be contained in the resin component that acts as a binder, as long as the advantageous effects of the present invention cannot be impaired. Specific examples of the additional resin component include modified polyolefin-type polymers each having at least one functional group selected from the group consisting of an epoxy group, a carboxyl group, an acid anhydride group, an amino group, an amide group, an oxazoline group, a hydroxyl group, a mercapto group, an ureido group and an isocyanate group. In addition, a copolymer of an olefin-type monomer with an olefin-type monomer or a vinyl-type monomer other than a vinyl-type monomer having any one of the above-mentioned functional groups (wherein the vinyl-type monomer is referred to as an "additional vinyl-type monomer", hereinafter), a hydrogenated form of the copolymer, a product of the addition of any one of the above-mentioned functional groups to the copolymer, and the like can also be used as the modified polyolefin-type polymer. The structures of these copolymers are not particularly limited, and a random copolymer, a block copolymer, a graft copolymer and the like can be mentioned. Among these copolymers, a block copolymer and a graft copolymer are more preferred. These modified polyolefin-type polymers may be used singly, or a combination of two or more of them may be used. The content of the additional resin component is preferably 50% by mass or less, more preferably 30% by mass or less, relative to the total mass of the resin components, and may be 0% by mass.

(Inorganic Compound Particles)

An example of the inorganic compound particles that can be used in the resin composition of this embodiment is an insulating ceramic. An example of the insulating ceramic is a perovskite-type ceramic composition containing both of at least one element selected from Ba, Ca, Sr and Pb and at least one element selected from Ti, Zr and Hf. Concretely, barium titanate, calcium titanate, strontium titanate, lead titanium zirconium oxide and the like can be preferably used. By adding the inorganic compound particles, it becomes possible to achieve an effect to improve the dielectric constant of the resin composition. The above-mentioned types of inorganic compound particles may be used singly, or a combination of two or more types of the inorganic compound particles may be used.

The form of the inorganic compound particles is not particularly limited, and may be selected appropriately depending on the intended use or the resin composition. Concretely, from the viewpoint of the dispersibility in the binder resin, spherical or particulate inorganic compound particles may be used. From the viewpoint of the strength of a film produced from the resin composition, plate-like, scale-like or other types of inorganic compound particles may also be used.

The particle diameter of each of the inorganic compound particles is not particularly limited. It is preferred that the inorganic compound particles have a weighted average particle diameter of 0.05 to 1.2 µm inclusive, more preferably 0.1 to 1.0 µm inclusive. If the weighted average particle diameter of the inorganic compound particles is less than 0.05 µm, the specific surface area of the inorganic compound particles may increase and therefore the dispersibility of the inorganic compound particles may be deteriorated. If the weighted average particle diameter of the inorganic compound particles exceeds 1.2 µm, void spaces between the particles may get bigger and therefore the moisture-proof properties of a film produced from the resin composition may be deteriorated.

The weighted average particle diameter of the inorganic compound particles can be determined by measuring the particle diameters of 100 particles of the inorganic compound particles by means of microscopic observation and then calculating the weighted average particle diameter from the measured particle diameters. In the case where the inorganic compound particles are of a plate-like form, a scale-like form or the like, each of the particle diameters can be determined by measuring the minor axis diameter and the major axis diameter of a particle to calculate the cross-sectional area of the particle and determining the diameter of a circle corresponding to the cross-sectional area as the particle diameter of the particle.

In the resin composition according to this embodiment, a mixture of two or more types of inorganic compound particles having different weighted average particle diameters from each other may be used. When two or more types of inorganic compound particles having different weighted average particle diameters from each other are used, the content of the inorganic compound particles in the resin composition can be increased. For example, when two types of inorganic compound particles having different weighted average particle diameters from each other are used, it is preferred that the weighted average particle diameter of one of the inorganic compound particles is adjusted to 0.05 μm to 0.3 μm inclusive and the weighted average particle diameter of the other of the inorganic compound particles is adjusted to 0.3 μm to 1.0 μm inclusive.

The content of the inorganic compound particles is preferably 40 vol % to 70 vol % inclusive, more preferably 45 vol % to 65 vol % inclusive, relative to the total mass of the resin composition. If the content of the inorganic compound particles is less than 40 vol %, the change in volume after sintering step may increase and therefore the change in dimension may increase. If the content of the inorganic compound particles exceeds 70 vol %, the resultant resin composition may become fragile.

(Additional Components)

The resin composition according to this embodiment may contain other (i.e., additional) component in addition to the resin component and the inorganic compound particles mentioned above, as long as the advantageous effects of the present invention cannot be impaired. Specific examples of the additional component include additives such as: a metal salt stabilizer (e.g., copper chloride, copper (I) iodide, copper acetate and cerium stearate); an antioxidant agent, or a heat resistance stabiliser (e.g., a hindered amine type organic compound, a hindered phenol type organic compound, a sulfur-containing compound, an acrylate type organic compound, and a phosphorus-containing organic compound); an ultraviolet ray absorber, a weathering agent or a light stabilizer (e.g., a benzophenone-type compound, a salicylate-type compound, and a benzotriazole-type compound); a surface-treating agent (e.g., a mold release agent, a lubricant, a crystal, nucleating agent, a viscosity modifier, a coloring agent and a silane coupling agent); a pigment; a fluorescent pigment; a dye; a fluorescent dye; a discoloration-preventing agent; a flame retardant agent, (e.g., red phosphorus, a metal hydroxide-type flame retardant agent, a phosphorus-containing flame retardant agent, a silicone-type flame retardant agent, a halogen-containing flame retardant agent, and a combination of the halogen-containing flame retardant agent and antimony trioxide); an anti-bacterial agent or an anti-mold agent (e.g., a wood powder, a rice hull powder, a walnut powder, used paper, a luminous pigment, a borate glass, a silver-containing antibacterial agent); a mold corrosion-preventing agent (e.g., a hydrotalcite typified by magnesium-aluminum hydroxyhydrate); a crystal nucleating agent; an antistatic agent; an anti-blocking agent; a surfactant; a dye; a deodorant agent; a plasticizer; a mold release agent; and a dispersant. Among these additives, a plasticizer is preferably added from the viewpoint of the improvement of flexibility of the resin composition.

Specific examples of the plasticizer include: an aromatic carboxylic acid ester; an aliphatic monocarboxylic acid ester; an aliphatic dicarboxylic acid ester; an aliphatic tricarboxylic acid ester; a phosphoric acid triester; a petroleum resin; a polyalkylene glycol-type plasticizer; an epoxy-type plasticizer; a castol oil-type plasticizer; a polyol ester (e.g., neopentyl glycol dibenzoate, diethylene glycol dibenzoate, triethylene glycol di-2-ethylbutyrate, polyoxyethylene diacetate, polyoxyethylene di(2-ethylhexanoate), polyoxypropylene monolaurate, polyoxypropylene monostearate, polyoxyethylene dibenzoate, and polyoxypropylene dibenzoate); an aliphatic carboxylic acid ester (e.g., butyl oleate); an oxy acid ester (e.g., triethyl acetylcitrate, tributyl acetylcitrate, ethocycarbonylmethyldibutyl citrate, di-2-ethylhexyl citrate, methyl acetylricinoleate, and butyl acetylricinoleate; a plant oil-type compound (e.g., soybean oil, a soybean oil fatty acid, a soybean oil fatty acid ester, an epoxidized soybean oil, rapeseed oil, a rapeseed oil fatty acid, a rapeseed oil fatty acid ester, an epoxidized rapeseed oil, linseed oil, a linseed oil fatty acid, a linseed oil fatty acid ester, an epoxidized linseed oil, palm oil, and a palm oil fatty acid); pentaerythritol; sorbitol; a polyacrylic acid ester; a silicone oil; and a paraffin-type compound. The content of the plasticizer is preferably 70% by mass or less, more preferably 60% by mass or less, relative to the total mass of the resin compositions, and may be 0% by mass. When the content of the plasticizer is 70% by mass or less, the flexibility of the resin composition can be improved without deteriorating the strength of the resin composition.

In the case where the additional component is contained, it is preferred to adjust the amount of the component in such a manner that the contents of the resin component and the inorganic compound particles in the resin composition can fall within the above-mentioned ranges.

The resin composition according to this embodiment has a storage elastic modulus (E') of $1.0\times10^8$ Pa or less, preferably $0.9\times10^7$ Pa or less, at 80° C. in a dynamic viscoelasticity (DMA) measurement at a vibration frequency of 10 Hz. When the storage elastic modulus of the resin composition is $1.0\times10^8$ Pa or less, the uneven surface of the multilayer sheet can be made smooth during a pressing process. The lower limit of the storage elastic modulus of the resin composition is not particularly limited, and the storage elastic modulus (E') is preferably $1.0\times10^6$ Pa or more, more preferably $1.0\times10^6$ Pa or more. If the storage elastic modulus of the resin composition is less than $1.0\times10^5$ Pa, the strength of a film formed from the resin composition may become insufficient.

The measurement of the dynamic viscoelasticity (DMA) of the resin composition can be carried out using a commercially available dynamic viscoelasticity measurement device (e.g., "DMS6100" manufactured by SII) under the following measurement conditions.

(Measurement of Elastic Modulus)
Vibration frequency: 10 Hz
Temperature range: 20 to 200° C.
Temperature elevation rate: 5° C./min
Test specimen: about 10 mm in width
Test mode: under tension (Method for Producing Resin Composition)

Next, one example of the method for producing the resin composition according to this embodiment will be described. The resin composition according to this embodiment can be produced by heating the resin component to a temperature equal to or higher than the melting point or the glass transition temperature thereof to make the resin component in a molten state (a liquid state) or a rubbery state, then adding the inorganic compound particles to the molten or rubbery resin component, and then kneading the resultant mixture.

The method for heating the resin component to a temperature equal to or higher than the melting point or the glass transition temperature thereof is not particularly limited, and it is preferred to use a hermetically closed kneader, i.e., a so-called "internal mixer". The method for adding the inorganic compound particles to the molten or rubbery resin component and kneading the mixture is not particularly limited, and it is preferred to use a kneader such as an open roll, a single-screw extruder, a twin-screw extruder, a kneader and a Banbury mixer.

After kneading, the kneaded product is granulated and then subjected to a cooling treatment and the like to produce pellets, tablets or the like of the resin composition.

<Resin Sheet>

Next, one embodiment of the resin sheet produced using the resin composition will be described.

The resin sheet according to this embodiment is produced by molding the resin composition into a sheet-like form. In the case where additional component is added during the molding of the resin composition into a sheet-like form, the additional component is regarded as substantially a component of the resin composition.

The thickness of the resin sheet according to this embodiment is preferably 1 μm or more, more preferably 30 μm or more, still more preferably 50 μm or more. The thickness of the resin sheet is also preferably 10000 μm or less, more preferably 3000 μm or less, still more preferably 1000 μm or less. If the thickness of the resin sheet is less than 1 μm, the film may be broken during handling.

(Method for Producing Resin Sheet)

Next, one example of the method for producing the resin sheet according to this embodiment will be described. The resin sheet according to this embodiment can be produced by adding the inorganic compound particles to the molten or rubbery resin component in the method for producing the resin composition, then kneading the mixture and then molding the kneaded product into a sheet-like or film-like form.

The method for molding the resin composition into a sheet-like or film-like form is not particularly limited, and it is preferred to use an extruder equipped with a T die.

Alternatively, the resin sheet may also be produced by dissolving the resin component in a solvent to prepare a resin solution, then adding the inorganic compound particles to the resin solution, then stirring the resultant solution to prepare a coating solution, and then applying the coating solution onto a substrate (e.g., a PET film).

A mother block thus produced is cut along the first-direction cutting-plane line and the second-direction cutting-plane line that are orthogonal to each other to produce a plurality of green chips. For the cutting of the mother block, a technique such as pressing-and-cutting with a blade, dicing with a dicer, guillotine cutting, laser cutting with a laser and the like can be employed.

Figure 8:
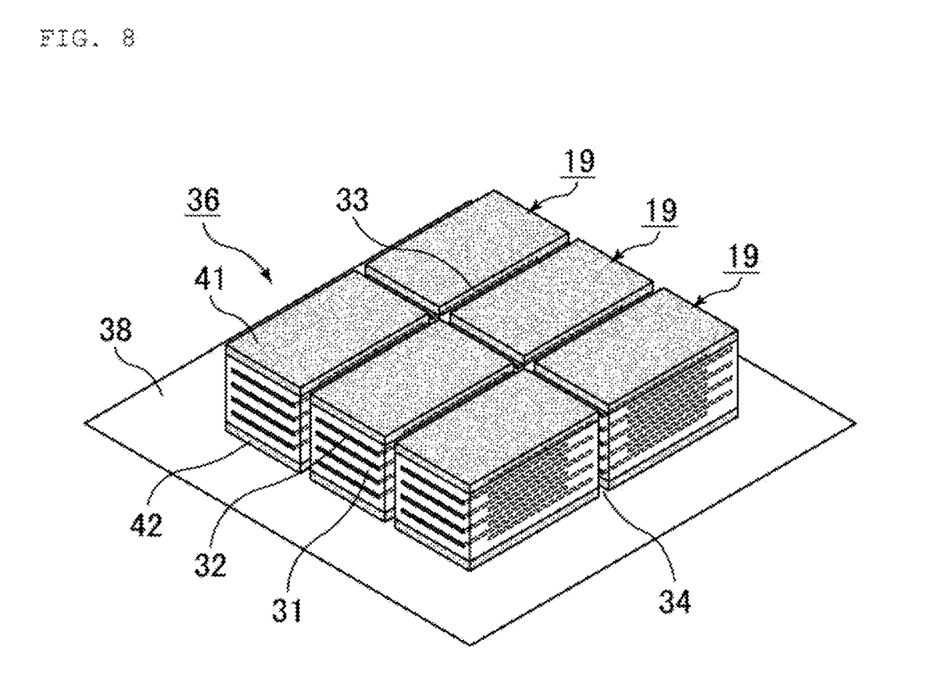
FIG. 8 is a perspective view schematically illustrating one embodiment of a mother block after the cutting of the mother block.

FIG. 8 is a perspective view schematically illustrating one embodiment of a mother block after the cutting of the mother block.

In FIG. 8, the mother block 36 is cut along a first-direction cutting-plane line 33 and a second-direction cutting-plane line 34 that are orthogonal to each other to produce a plurality of green chips 19 that are arranged in rows and columns. In FIG. 8, six pieces of green chips 19 are obtained from one mother block 36. In practice, however, a greater number of pieces of green chips 19 can be obtained from one mother block 36.

Between the individual green chips 19, there are void spaces resulted from the cutting. The size of each of the void spaces, i.e., the distance between the green chips 19, is a size corresponding to the thickness of a cutting part of a blade or the like, and is not particularly limited. For example, the size is about 200 μm or less.

Each of the green chips 19 obtained from the mother block 36 by dice-cutting is then subjected to a firing process as mentioned below, and eventually becomes the component main body 12 that is a component of the multilayer ceramic capacitor 11 shown in FIGS. 1, 2, and 3. Each of the green chips 19 has a multilayer structure composed of a plurality of unfired ceramic layers (ceramic green sheets 31 that serve as ceramic layers 21) and a plurality of internal electrodes (an internal electrode pattern 32 that serves as internal electrodes 22 and 23).

As in the case in FIG. 2, the internal electrode pattern 32 (that serves as the internal electrodes 22 and 23) is not exposed on both side surfaces of each of the green chips 19 (wherein the both side surfaces are formed as the result of cutting along the first-direction cutting-plane line 33).

On one of end surfaces of each of the green chips 19 (wherein the end surfaces are formed as the result of cutting along the second-direction cutting-plane line 34), only internal electrode patterns 32 that serve as the internal electrodes 22 are exposed. On the other of the end surfaces, only internal electrode patterns 32 that serve as the internal electrodes 23 are exposed.

As shown in FIG. 8, it is preferred to cut the mother block 36 while attaching the mother block 36 onto an adhesive sheet 38, so that the green chips 19 are arranged in rows and columns. As the adhesive sheet, a commonly used dicing sheet, a commonly used dicing tape, an expand sheet that can expand upon heating or the like can be used.

Subsequently, each of the green chips is subjected to a binder removal treatment.

The binder removal treatment can be carried out under conventional conditions. In the case where a non-precious metal (e.g., Ni, a Ni alloy) is used as the conductive material for the internal electrode layer, the following conditions are preferred: temperature elevation rate: 5° C./hr to 300° C./hr inclusive (particularly 5° C./hr to 50° C./hr inclusive), retention temperature: 200° C. to 700° C. inclusive (particularly 300° C. to 650° C. inclusive), retention time: 0.5 to 20 hours inclusive (particularly 1 to 10 hours inclusive), and atmosphere: a humidified gas mixture of $N_2$ and $H_2$.

Subsequently, the binder-removed green chips are fired. After the firing, the chips may be subjected to a heat treatment (annealing).

For example, the green chip 19 shown in FIG. 8 can be made into the component main body 12, which is a component of the multilayer ceramic capacitor 11 shown in FIGS. 1, 2, and 3, by firing. The unfired protection layers 41 and 42 formed in the green chip 19 become a part of the ceramic layer 21 along with the ceramic green sheet 31. Therefore, in the component main body 12 obtained by the firing, it is not necessarily required that the boundaries between portions corresponding to the unfired protection layers 41 and 42 and a portion corresponding to the ceramic green sheet 31 should appear clearly.

The firing is preferably carried out, for example, under the following conditions: temperature elevation rate: 50° C./hr to 500° C./hr inclusive (particularly 200° C./hr to 300° C./hr inclusive), retention temperature: 1100° C. to 1300° C. inclusive (particularly 1150° C. to 1250° C. inclusive), retention time: 0.5 to 8 hours inclusive (particularly 1 to 3 hours inclusive), cooling rate: 50° C./hr to 500° C./hr inclusive (particularly 200° C./hr to 300° C./hr inclusive, and atmospheric gas: a humidified gas mixture of $N_2$ and $H_2$.

The oxygen partial pressure in the atmosphere employed during the firing is preferably $10^{-2}$ Pa or less, particularly preferably $10^{-8}$ Pa to $10^{-2}$ Pa inclusive. If the oxygen partial pressure exceeds the above-mentioned range, the internal electrode may be oxidized. If the oxygen partial pressure is too low, abnormal sintering of the electrode material for the internal electrode may occur, resulting in the disruption of the internal electrode.

The heat treatment (annealing) after the firing is preferably carried out at a retention temperature or a highest temperature of 900° C. or higher, more preferably 1000° C. to 1100° C. inclusive. If the retention temperature or the highest temperature in the heat treatment is lower than the above-mentioned range, the oxidation of the dielectric material may not proceed satisfactorily and therefore the insulation resistance life may be shortened. If the retention temperature or the highest temperature is higher than the above-mentioned range, Ni in the internal electrode may be oxidized to reduce the capacity and may also react with the dielectric material to shorten the life of the resultant component main body. The oxygen partial pressure in the atmosphere during the heat treatment is higher than a reductive atmosphere employed during the firing, and is preferably $10^{-3}$ Pa to 1 Pa inclusive, more preferably $10^{-2}$ Pa to 1 Pa inclusive. If the oxygen partial pressure is lower than the above-mentioned range, the re-oxidization of the dielectric layer hardly occurs. If the oxygen partial pressure exceeds the above-mentioned range, the internal electrode may be oxidized.

Other conditions for the heat treatment are as follows: retention time: 6 hours or shorter (particularly 2 to 5 hours inclusive), cooling rate: 50° C./hr to 500° C./hr inclusive (particularly 100° C./hr to 300° C./hr inclusive), and atmospheric gas: a humidified $N_2$ gas.

For the humidification of a $N_2$ gas, a gas mixture or the like, a bubbling machine that allows the gas to pass through warmed water or the like may be used. In this case, the temperature of water is preferably about 0° C. to 75° C. inclusive. The binder removal treatment, the firing and the heat treatment may be carried out sequentially or independently.

The component main body 12 obtained by the firing is subjected to edge surface polishing by means of barrel finishing, sand blasting or the like, and then an external electrode paste is applied onto the polished surface and then baked. In this manner, a first external electrode 24 and a second external electrode 25 can be formed. The firing of the external electrode paste is preferably carried out in a humidified gas mixture of $N_2$ and $H_2$, for example, under the following conditions: a temperature of 600° C. to 800° C. inclusive for a time of 10 minutes to 1 hour. The external electrode paste may be applied onto the unfired component main body (green chip), and the baking of the external electrode paste may be carried out simultaneously with the firing of the unfired component main body. If necessary, a plating or the like may be applied onto the first external electrode 24 and the second external electrode 25.

In the above-mentioned manner, the multilayer ceramic capacitor 11 shown in FIG. 1 can be produced.

The multilayer ceramic capacitor thus produced can be used in various electronic devices and the like in such a form that the multilayer ceramic capacitor is mounted on a printed circuit board or the like by soldering.

As mentioned above, the production method according to the present invention is not limited to a method for producing a multilayer ceramic capacitor, and can also be employed as a method for producing a multilayer ceramic electronic component other than a multilayer ceramic capacitor.

In the method for producing a multilayer ceramic electronic component according to the present invention, the unfired protection layer is formed on at least one main surface of the multilayer sheet. The chemical composition of the ceramic to be contained in the resin composition for forming the unfired protection layer may be the same as or different from that of the ceramic contained in the ceramic green sheet for forming a ceramic layer other than the unfired protection layer. For example, as the ceramic to be contained in the resin composition, a ceramic powder having larger particle diameters than the ceramic contained in the ceramic green sheet can be used.

When the chemical composition of the ceramic to be contained in the resin composition is different from that of the ceramic contained in the ceramic green sheet, the color of a part corresponding to the unfired protection layer can become different from the colors of other ceramic layers, for example. In this case, it becomes possible to distinguish the portion corresponding to the unfired protection layer from other surfaces by the difference in color between them. As a result, the direction of the multilayer ceramic electronic component can be recognized by appearance.

Therefore, a multilayer ceramic electronic component having the following characteristic properties is also one embodiment of the present invention.

The multilayer ceramic electronic component according to the present invention includes: a component main body which includes a plurality of ceramic layers and a plurality of internal electrodes both arranged in a lamination direction, and has a first main surface and a second main surface that face each other in a lamination direction, a first side surface and a second side surface that face each other in a width direction that is orthogonal to the lamination direction, and a first edge surface and a second edge surface that face each other in a length direction that is orthogonal to both of the lamination direction and the width direction; and a first external electrode and a second external electrode respectively provided on the first edge surface and the second edge surface of the component main body; in which a ceramic constituting at least one of the first main surface and the second main surface of the component main body has a different chemical composition from that of a ceramic constituting a ceramic layer located inside the first main surface and the second main surface of the component main body.

The term "a different chemical composition" as used herein includes a case where the types of elements contained in a ceramic are different from those in another ceramic, as well as a case where the contents of elements contained in a ceramic are different from those in another ceramic even though the types of the elements in the ceramic are same as those in another ceramic. Provided that, the above-mentioned difference excludes a difference to such an extent that occurs unintentionally during production processes of these ceramics.

EXAMPLES

Hereinafter, examples which disclose the method for producing a multilayer ceramic electronic component according to the present invention more specifically will be described. However, the present invention is not intended to be limited to these examples.

(1) Preparation of Resin Composition

Example 1

An ethylene-(methyl acrylate) copolymer resin (manufactured by Japan Polyethylene Corporation, EB440H, melting point: 77° C., MFE: 18 g/10 min) (25.6 g) and barium titanate (manufactured by Nippon Chemical Industrial Co., Ltd., BTC-4FA) (125.4 g) were kneaded together with a mixer (manufactured by Toyo Seiki Seisaku-sho, Ltd., Labo Plastomill) at 100° C. for 15 minutes to prepare a resin composition.

The resin composition was pressed to produce a resin sheet having a thickness of 0.05 mm to 1.0 mm.

Example 2

An ethylene-(methyl acrylate) copolymer resin (manufactured by Japan Polyethylene Corporation, EB440H, melting point: 77° C., MFR: 18 g/10 min) (22.6 g) and barium titanate (manufactured by Nippon Chemical Industrial Co., Ltd., BTC-4FA) (144.6 g) were kneaded together with a mixer (manufactured by Toyo Seiki Seisaku-sho, Ltd., Labo Plastomill) at 100° C. for 15 minutes to prepare a resin composition.

The resin composition was pressed to produce a resin sheet having a thickness of 0.05 mm to 1.0 mm.

Example 3

An ethylene-(methyl acrylate) copolymer resin (manufactured by Japan Polyethylene Corporation, EB440H, melting point: 77° C., MFR: 18 g/10 min) (20.4 g) and barium titanate (manufactured by Nippon Chemical Industrial Co., Ltd., BTC-4FA) (158.8 g) were kneaded together with a mixer (manufactured by Toyo Seiki Seisaku-sho, Ltd., Labo Plastomill) at 100° C. for 15 minutes to prepare a resin composition.

The resin composition was pressed to produce a resin sheet having a thickness of 0.05 mm to 1.0 mm.

Example 4

An ethylene-(methyl acrylate) copolymer resin (manufactured by Japan Polyethylene Corporation, EB440H, melting point: 77° C., MFR; 18 g/10 min) (18.1 g) and barium titanate (manufactured by Nippon Chemical Industrial Co., Ltd., BTC-4FA) (173.5 g) were kneaded together with a mixer (manufactured by Toyo Seiki Seisaku-sho, Ltd., Labo Plastomill) at 100° C. for 15 minutes to prepare a resin composition.

The resin composition was pressed to produce a resin sheet having a thickness of 0.05 mm to 1.0 mm.

Example 5

An ethylene-(methyl acrylate) copolymer resin (manufactured by Japan Polyethylene Corporation, EB440H, melting point: 77° C., MFR: 18 g/10 min) (15.0 g) and barium titanate (manufactured by Nippon Chemical Industrial Co., Ltd., BTC-4FA) (193.6 g) were kneaded together with a mixer (manufactured by Toyo Seiki Seisaku-sho, Ltd., Labo Plastomill) at 100° C. for 15 minutes to prepare a resin composition.

The resin composition was pressed to produce a resin sheet having a thickness of 0.05 mm to 1.0 mm.

Example 6

A ethylene-(methyl methacrylate) copolymer resin (manufactured by Sumitomo Chemical Co., Ltd., WK402, melting point: 79° C., MFR: 20 g/10 min) (22.6 g) and barium titanate (manufactured by Nippon Chemical Industrial Co., Ltd., BTC-4FA) (144.6 g) were kneaded together with a mixer (manufactured by Toyo Seiki Seisaku-sho, Ltd., Labo Plastomill) at 100° C. for 15 minutes to prepare a resin composition.

The resin composition was pressed to produce a resin sheet having a thickness of 0.05 mm to 1.0 mm.

Example 7

An ethylene-(ethyl acrylate) copolymer resin (manufactured by NUC, NUC-6570, melting point: 91° C., MFR: 20 g/10 min) (22.6 g) and barium titanate (manufactured by Nippon Chemical Industrial Co., Ltd., BTC-4FA) (144.6 g) were kneaded together with a mixer (manufactured by Toyo Seiki Seisaku-sho, Ltd., Labo Piastomill) at 100° C. for 15 minutes to prepare a resin composition.

The resin composition was pressed to produce a resin sheet having a thickness of 0.05 mm to 1.0 mm.

Example 8

An ethylene-(vinyl acetate) copolymer resin (manufactured, by NUC Corporation, DQDJ-3269, melting point: 69° C., MFR: 20 g/10 min) (22.9 g) and barium titanate (manufactured by Nippon Chemical Industrial Co., Ltd., BTC-4FA) (145.2 g) were kneaded together with a mixer (manufactured by Toyo Seiki Seisaku-sho, Ltd., Labo Plastomill) at 100° C. for 15 minutes to prepare a resin composition.

The resin composition was pressed to produce a resin sheet having a thickness of 0.05 mm to 1.0 mm.

Example 9

An ethylene-(methyl methacrylate) copolymer resin (manufactured by Sumitomo Chemical Co., Ltd., CM5022, melting point: 63° C., MFR: 450 g/10 min) (22.8 g) and barium titanate (manufactured by Nippon Chemical Industrial Co., Ltd., BTC-4FA) (144.5 g) were kneaded together with a mixer (manufactured by Toyo Seiki Seisaku-sho, Ltd., Labo Plastomill) at 100° C. for 15 minutes to prepare a resin composition.

The resin composition was pressed to produce a resin sheet having a thickness of 0.05 mm to 1.0 mm.

Comparative Example 1

An ethylene-(methyl methacrylate) copolymer resin (manufactured by Sumitomo Chemical Co., Ltd., WD106, melting point: 101° C., MFR: 0.32 g/10 min) (22.0 g) and barium titanate (manufactured by Nippon Chemical Industrial Co., Ltd., BTC-4FA) (144.5 g) were kneaded together with a mixer (manufactured by Toyo Seiki Seisaku-sho, Ltd., Labo Plastomill) at 100° C. for 15 minutes to prepare a resin composition.

The resin composition was pressed to produce a resin sheet having a thickness of 0.05 mm to 1.0 mm.

Comparative Example 2

A low-density polyethylene resin (manufactured by Tosoh Corporation, 203, melting point: 105° C., MFR: 8.0 g/10 min) (22.0 g) and barium titanate (manufactured by Nippon Chemical Industrial Co., Ltd., BTC-4FA) (144.5 g) were kneaded together with a mixer (manufactured by Toyo Seiki Seisaku-sho, Ltd., Labo Plastomill) at 100° C. for 15 minutes to prepare a resin composition.

The resin composition was pressed to produce a resin sheet having a thickness of 0.05 mm to 1.0 mm.

Comparative Example 3

An ethylene-(methyl acrylate) copolymer resin (manufactured by Japan Polyethylene Corporation, EB440H, melting point: 77° C., MFR: 18 g/10 min) (27.1 g) and barium titanate (manufactured by Nippon Chemical Industrial Co., Ltd., BTC-4FA) (115.6 g) were kneaded together with a mixer (manufactured by Toyo Seiki Seisaku-sho, Ltd., Labo Plastomill) at 100° C. for 15 minutes to prepare a resin composition.

The resin composition was pressed to produce a resin sheet having a thickness of 0.05 mm to 1.0 mm.

Comparative Example 4

An ethylene-(methyl acrylate) copolymer resin (manufactured by Japan Polyethylene Corporation, EB440H, melting point: 77° C., MFR: 18 g/10 min) (13.2 g) and barium titanate (manufactured by Nippon Chemical Industrial Co., Ltd., BTC-4FA) (204.9 g) were kneaded together with a mixer (manufactured by Toyo Seiki Seisaku-sho, Ltd., Labo Plastomill) at 100° C. for 15 minutes to prepare a resin composition.

The resin composition was pressed to produce a resin sheet having a thickness of 0.05 mm to 1.0 mm.

(2) Production of Multilayer Block

A polyvinyl butyral-type binder, a plasticizer and ethanol that was an organic solvent were added to $BaTiO_3$ that was a ceramic raw material, and then these components were wet-blended together with a ball mill to prepare a ceramic slurry. Subsequently, the ceramic slurry was molded into a sheet in a LIP mode to produce a rectangular ceramic sheet having a thickness of 1 μm. Subsequently, the ceramic sheet was screen-printed with a Ni-containing conductive paste to form a conductive film having a thickness of 0.5 μm which served as an internal electrode containing Ni as the main component.

Subsequently, two ceramic sheets each having no conductive film formed thereon were laminated together, then 80 ceramic sheets each having a conductive film formed thereof were laminated on the resultant laminate in such a manner that the extended sides of the conductive films were alternating with each other, and then three ceramic sheets each having no conductive film formed thereon were further laminated on the resultant laminate to produce an unfired multilayer sheet that served as a component main body of a capacitor. Resin sheets each having a thickness of 50 μm, which served as both of a first protection part and a second protection part, were provided over and below the unfired multilayer sheet, respectively. The resultant laminate was heated and pressed with a rigid press under the conditions of a rigid plate temperature of 80° C. and a pressure of 1.0 ton/cm² to produce a multilayer block (a mother block).

(3) Cutting of Multilayer Block, and Firing of Chips

The multilayer block was cut by means of dicing to produce green chips. The green chips were heated at 250° C. in an $N_2$ atmosphere to burn the binder, and then the resultant green chips were fired at 1200° C. in a reductive atmosphere containing an $H_2$ gas, an $N_2$ gas an and $H_2O$ gas to produce a sintered component main body.

The dimension of the component main body was 1.0 mm in the length direction ($D_L$), 0.5 mm in the width direction ($D_W$) and 0.20 mm in the height direction ($D_T$).

(4) Formation of External Electrodes

External electrodes each having a structure composed of an underlying electrode layer (a baked layer) and a plated layer were formed on the fired component main body. The material for forming the underlying electrode layer (baked layer) contained Cu and a glass and was baked at 850° C. For forming the plated layer, Cu plating was carried out.

<Method for Measuring Dynamic Viscoelasticity (DMA)>

Each of the resin sheets produced in Examples and Comparative Examples was cut into pieces having a size of 7 cm×1 cm, and each of the pieces was placed, as a specimen having a measurement length of 2 cm and a film width of 1 cm, on a sample holder. Subsequently, the storage elastic modulus E' and the loss coefficient tan δ of each of the specimens were measured using a dynamic viscoelasticity measurement device (manufactured by Seiko Instruments Inc., DMS6100) under the conditions of a tension mode, a temperature range from room temperature 20° C.) to 130° C., a displacement of 5 μm, a vibration frequency of 10 Hz and a temperature elevation rate of 5° C./min. The tan δ was determined as a ratio of a loss elastic modulus E'' to a storage elastic modulus E'. A storage elastic modulus E' at 80° C. was read out from a graph obtained above.

<Evaluation of Smoothness>

Three samples of each of the component main bodies, which had been fired under various conditions, were prepared, and the surface unevenness of a first main surface in each of the samples was measured. The surface unevenness was measured by observing an LT cross section at a position that was located at ½ depth of each of the main bodies as observed in the W direction with an optical microscope. A difference between a highest point and a lowest point in the first main surface was calculated, and the smoothness was evaluated in accordance with the following evaluation criteria:

◯: values of the surface unevenness in all of three samples fell within a range of ±3 μm; and ×: a value of the surface unevenness in any one of three samples exceeded a range of ±3 μm.

<Evaluation of Delamination of Outer Layer>

Twenty samples of each of the fired component main bodies were subjected to an appearance test. The occurrence of delamination of a part, which corresponded to a protection part, in an outer layer was confirmed, and the delamination of the outer layer was evaluated in accordance with the following determination criteria:

◯: the delamination of the outer layer was not observed at any area; and

×; the delamination of the outer layer was observed at one or more areas.

TABLE 1

|  |  | Example 1 | Example 2 | Example 3 | Example 4 | Example 5 | Example 6 | Example 7 |
|---|---|---|---|---|---|---|---|---|
| Resin component | Type of resin | EMA | EMA | EMA | EMA | EMA | EMMA | EEA |
|  | Melting point (° C.) | 77 | 77 | 77 | 77 | 77 | 79 | 91 |
| Content of inorganic compound particles | vol % | 40 | 50 | 55 | 60 | 70 | 50 | 50 |
| Storage elastic modulus at 80° C. | Pa | 1.0E+06 | 5.0E+06 | 3.0E+07 | 7.0E+07 | 1.0E+08 | 4.0E+06 | 1.0E+07 |
| Smoothness |  | ○ | ○ | ○ | ○ | ○ | ○ | ○ |
| Delamination of outer layer |  | ○ | ○ | ○ | ○ | ○ | ○ | ○ |

|  |  | Example 8 | Example 9 | Comparative Example 1 | Comparative Example 2 | Comparative Example 3 | Comparative Example 4 |
|---|---|---|---|---|---|---|---|
| Resin component | Type of resin | EVA | EMMA | EMMA | LDPE | EMA | EMA |
|  | Melting point (° C.) | 69 | 63 | 101 | 105 | 77 | 77 |
| Content of inorganic compound particles | vol % | 50 | 50 | 50 | 50 | 35 | 75 |
| Storage elastic modulus at 80° C. | Pa | 5.0E+06 | 1.0E+06 | 2.0E+08 | 2.0E+08 | <1.0E+06 | 2.0E+06 |
| Smoothness |  | ○ | ○ | x | x | ○ | x |
| Delamination of outer layer |  | ○ | ○ | ○ | ○ | x | x |

In Table 1, "EMA" represents an ethylene-(methyl acrylate) copolymer resin, "EMMA" represents an ethylene-(methyl methacrylate) copolymer resin, "EEA" represents an ethylene-(ethyl acrylate) copolymer resin, "EVA" represents an ethylene-(vinyl acetate) copolymer resin, and "LDPE" represents a low-density polyethylene resin.

With respect to the indication for the storage elastic modulus, "1.0E+06" in Example 1, for example, means "$1.0 \times 10^6$".

In each of Examples 1 to 9, as shown in Table 1, the smoothness of a first main surface was superior and the delamination of an outer layer was not observed, because a resin composition which contained a resin component having a melting point of lower than 100° C. and inorganic compound particles, contained the inorganic compound particles at a content of 40 vol % to 70 vol % inclusive and had a storage elastic modulus of $1.0 \times 10^8$ Pa or less at 80° C. was used.

In contrast, in each of Comparative Examples 1 and 2, fluidability was poor and the smoothness of a first main surface was insufficient, because a resin composition which contained a resin component having a melting point of 100° C. or higher and had a storage elastic modulus of more than $1.0 \times 10^8$ Pa at 80° C. was used.

In Comparative Example 3, the amount of shrinkage of a protection part during firing was large and therefore the delamination of an outer layer occurred, because a resin composition which contained inorganic compound particles at a content of less than 40 vol % was used.

In Comparative Example 4, fluidability was poor and the smoothness of a first main surface was insufficient, because a resin composition which contained inorganic compound particles at a content of more than 70 vol % and had a storage elastic modulus of more than $1.0 \times 10^8$ Pa at 80° C. was used. In addition, a protection part was shrunk little, while the inside was shrunk, during firing. As a result, the delamination of the outer layer occurred.

What is claimed is:

1. A method for producing a multilayer ceramic electronic component, the method comprising:
    producing a multilayer sheet which includes a plurality of alternately arranged ceramic green sheets and internal electrode patterns, the multilayer sheet having a first main surface and a second main surface that are located and oriented opposite to each other in a lamination direction of the multilayer sheet;
    placing, and pressure-bonding under heating, a resin composition onto at least one of the first main surface and the second main surface of the multilayer sheet to produce a mother block having an unfired protection layer formed thereon; and
    cutting the mother block along a first-direction cutting-plane and a second-direction cutting-plane that are orthogonal to each other to produce a plurality of green chips each having a multilayer structure, and wherein
    the resin composition includes a resin component having a melting point of lower than 100° C., and includes inorganic compound particles,
    a content of the inorganic compound particles in the resin composition is 40 vol % to 70 vol %, and the resin composition has a storage elastic modulus of 1.0×10⁸ Pa or less at 80° C. as measured in a dynamic viscoelasticity measurement at a vibration frequency of 10 Hz.

2. The method for producing a multilayer ceramic electronic component according to claim 1, wherein the resin component contains at least one ethylene-based copolymer selected from an ethylene-(vinyl acetate) copolymer, an ethylene-(methyl acrylate) copolymer, an ethylene-(methyl methacrylate) copolymer, an ethylene-(ethyl acrylate) copolymer, a (vinyl chloride)-(vinyl acetate) copolymer, an ethylene-(acrylic acid) copolymer and an ethylene-(methacrylic acid) copolymer.

3. The method for producing a multilayer ceramic electronic component according to claim 2, wherein the inorganic compound particles contain a perovskite-type ceramic composition containing at least one element selected from Ba, Ca, Sr, and Pb and at least one element selected from Ti, Zr, and Hf.

4. The method for producing a multilayer ceramic electronic component according to claim 1, wherein the inorganic compound particles contain a perovskite-type ceramic composition containing at least one element selected from Ba, Ca, Sr, and Pb and at least one element selected from Ti, Zr, and Hf.

5. The method for producing a multilayer ceramic electronic component according to claim 1, wherein the unfired protection layer has a thickness of 1 μm to 10000 μm.

6. The method for producing a multilayer ceramic electronic component according to claim 1, wherein the melting point of the resin component is greater than 40° C. and lower than 100° C.

7. The method for producing a multilayer ceramic electronic component according to claim 1, wherein the melting point of the resin component is greater than 50° C. and lower than 100° C.

8. The method for producing a multilayer ceramic electronic component according to claim 2, wherein the ethylene-based copolymer contains ethylene and a vinyl group having a polar group as monomer units, and a content of the vinyl group having the polar group is 5% to 50% by mass inclusive, relative to a total mass of the ethylene-based copolymer.

9. The method for producing a multilayer ceramic electronic component according to claim 2, wherein a weight average molecular weight of the ethylene-based copolymer as measured by gel permeation chromatography is $1\times10^4$ to $2\times10^6$ inclusive in terms of polystyrene.

10. The method for producing a multilayer ceramic electronic component according to claim 2, wherein a molecular weight distribution of the ethylene-based copolymer is 1.0 to 3.5 inclusive.

11. The method for producing a multilayer ceramic electronic component according to claim 2, wherein a content of the ethylene-based copolymer is 20% by mass or more relative to a total mass of all resin components in the resin composition.

12. The method for producing a multilayer ceramic electronic component according to claim 1, wherein a weighted average particle diameter of each of the inorganic compound particles is 0.05 to 1.2 μm inclusive.

13. The method for producing a multilayer ceramic electronic component according to claim 1, wherein the content of the inorganic compound particles in the resin composition is 45 vol % to 65 vol % inclusive.

14. The method for producing a multilayer ceramic electronic component according to claim 1, wherein the storage elastic modulus of the resin composition is $0.9\times10^7$ Pa or less.

15. The method for producing a multilayer ceramic electronic component according to claim 1, wherein the storage elastic modulus of the resin composition is not less than $1.0\times10^5$ Pa.

16. The method for producing a multilayer ceramic electronic component according to claim 14, wherein the storage elastic modulus of the resin composition is not less than $1.0\times10^6$ Pa.

* * * * *